(12) United States Patent
Bouthinon et al.

(10) Patent No.: US 11,775,018 B2
(45) Date of Patent: Oct. 3, 2023

(54) DEVICE INTEGRATING AN IMAGE SENSOR AND A DISPLAY SCREEN

(71) Applicant: ISORG, Limoges (FR)

(72) Inventors: Benjamin Bouthinon, Limoges (FR); Richun Fei, Limoges (FR); Agathe Puszka, Limoges (FR); Quentin Chable, Limoges (FR); Pierre Muller, Limoges (FR)

(73) Assignee: ISORG, Limoges (FR)

( * ) Notice: Subject to any disclaimer, the term of this patent is extended or adjusted under 35 U.S.C. 154(b) by 92 days.

(21) Appl. No.: 16/763,708

(22) PCT Filed: Nov. 9, 2018

(86) PCT No.: PCT/FR2018/052788
§ 371 (c)(1),
(2) Date: May 13, 2020

(87) PCT Pub. No.: WO2019/097145
PCT Pub. Date: May 23, 2019

(65) Prior Publication Data
US 2020/0301477 A1    Sep. 24, 2020

(30) Foreign Application Priority Data
Nov. 15, 2017    (FR) .................................... 17/60719

(51) Int. Cl.
*G06F 1/16*       (2006.01)
*G06F 3/041*      (2006.01)
(Continued)

(52) U.S. Cl.
CPC .......... *G06F 1/1656* (2013.01); *G06F 1/1643* (2013.01); *G06F 3/0412* (2013.01);
(Continued)

(58) Field of Classification Search
CPC ............ C12Q 1/6827; C12Q 2565/125; C12Q 2565/501; G06F 1/1643; G06F 1/1656;
(Continued)

(56) References Cited

U.S. PATENT DOCUMENTS

2008/0084526 A1    4/2008  Yamanaka et al.
2011/0304763 A1*  12/2011  Choi .................... H04N 5/2253
                                                          348/E5.025
(Continued)

FOREIGN PATENT DOCUMENTS

EP    1944807 A1    7/2008
EP    2237104 A1    10/2010
(Continued)

OTHER PUBLICATIONS

Authorized Officer: Durand, Jacques, International Search Report issued in counterpart PCT application No. PCT/FR2018/052788, dated Feb. 4, 2019, 3 pp.
(Continued)

*Primary Examiner* — Chun-Nan Lin
(74) *Attorney, Agent, or Firm* — KAPLAN BREYER SCHWARZ, LLP

(57) ABSTRACT

A device includes a display screen and an image sensor. A first electromagnetic shielding layer permeable to light is arranged between active portions of the display screen and active portions of the image sensor.

19 Claims, 3 Drawing Sheets

(51) Int. Cl.
*G06F 3/042* (2006.01)
*G06V 40/13* (2022.01)

(52) U.S. Cl.
CPC ........ *G06F 3/0421* (2013.01); *G06V 40/1318* (2022.01); *G06F 2203/04107* (2013.01)

(58) Field of Classification Search
CPC ......... G06F 2203/04107; G06F 3/0412; G06F 3/042; G06F 3/0421; G06V 40/1318
See application file for complete search history.

(56) References Cited

U.S. PATENT DOCUMENTS

| | | | | |
|---|---|---|---|---|
| 2015/0022495 | A1* | 1/2015 | Bussat | G06F 3/0448 |
| | | | | 345/173 |
| 2015/0084907 | A1* | 3/2015 | Burberry | H05K 1/0296 |
| | | | | 345/174 |
| 2015/0153881 | A1* | 6/2015 | Misaki | G06F 3/0412 |
| | | | | 345/174 |
| 2016/0011691 | A1* | 1/2016 | Shinkai | G06F 3/0447 |
| | | | | 345/174 |
| 2016/0169958 | A1* | 6/2016 | Ohtsuka | G01R 31/08 |
| | | | | 324/501 |
| 2016/0320543 | A1* | 11/2016 | Schlaupitz | G02B 6/0035 |
| 2017/0220844 | A1 | 8/2017 | Jones et al. | |
| 2017/0221960 | A1* | 8/2017 | Lin | H01L 51/5056 |
| 2018/0253583 | A1* | 9/2018 | Nogueyra | G06V 40/1371 |

FOREIGN PATENT DOCUMENTS

| | | |
|---|---|---|
| EP | 2458482 A2 | 5/2012 |
| FR | 2996933 A1 | 4/2014 |

OTHER PUBLICATIONS

Authorized Officer Jacques Durand, English Translation of the Written Opinion of the International Searching Authority issued in counterpart PCT application No. PCT/FR2018/052788 dated Feb. 4, 2019.

Communication, and English Translation thereof, issued in EP Application No. 18827149.8 dated Jun. 24, 2022.

Thomas Sannicolo et al, Metallic Nanowire-Based Transparent Electrodes for Next Generation Flexible Devices: a Review, Oct. 18, 2016, pp. 6052-6075, vol. 12, No. 44.

* cited by examiner

DEVICE INTEGRATING AN IMAGE SENSOR AND A DISPLAY SCREEN

The present patent application claims the priority benefit of French patent application 17/60719 which is herein incorporated by reference.

BACKGROUND

The present disclosure generally relates to electronic devices and, more particularly, to devices comprising a display screen and an image sensor. The present disclosure more particularly applies to electronic devices where the image sensor has a fingerprint sensor function.

DISCUSSION OF THE RELATED ART

Many computers, touch pads, cell phones, smart watches, are equipped with a touch or non-touch screen and with a camera. There are also many devices of this type also equipped with a fingerprint sensor. Such a fingerprint sensor is generally arranged outside of the surface occupied by the display screen.

More recently, printed image sensors, capable of being used at the periphery of, or even under, a display screen, have been introduced. Such an image sensor technology is described, for example, in documents FR-A-2996933, WO-A-2015-0293661 (B12003).

The emergence of this technology has opened the way to the integration, in an electronic device, of a fingerprint sensor, made in the form of an image sensor, under a display screen.

It would be desirable to improve the forming of such a device integrating a fingerprint sensor and a display screen.

Document EP-A-2 458 482 describes an array of pixels where an EMI filter which covers data lines is provided and is interposed between a readout line and a data line. The EMI filter forms a wire mesh.

Document US-A-2008/0084526 provides a screen with a mesh conductor forming a shielding screen.

SUMMARY

An embodiment provides reducing all or part of the disadvantages of know techniques of integration of an image sensor used as a fingerprint sensor under a display screen.

An embodiment provides a solution compatible with the integration of the sensor under all or part of the screen.

An embodiment provides a solution particularly adapted to OLED screens.

Thus, an embodiment provides a device comprising a display screen and an image sensor, wherein a first electromagnetic shielding layer permeable to light is arranged between active portions of the screen and active portions of the image sensor.

According to an embodiment, the image sensor is a fingerprint sensor.

According to an embodiment, the first layer is intended to be coupled, preferably connected, to a ground of the device.

According to an embodiment, a second electromagnetic shielding layer, intended to be coupled, preferably connected, to a ground of the device, is arranged between the image sensor and an electronic board.

According to an embodiment, said first layer is made of metal, preferably of gold, and has a thickness smaller than 10 nm, preferably smaller than 5 nm.

According to an embodiment, said first layer is made of a metal oxide, preferably an indium tin oxide (ITO), and has a thickness smaller than 100 μm.

According to an embodiment, said first layer is made of a transparent conductive polymer, preferably of PEDOT: PSS, and has a thickness smaller than 10 μm.

According to an embodiment, the first transparent polymer layer is full plate.

According to an embodiment, said first layer integrates a network of silver nanowires.

According to an embodiment, the surface area of said first layer corresponds at least to the opposite surface between the screen and the sensor.

According to an embodiment, said first layer is arranged between an optical filter and a support of the screen.

According to an embodiment, said first layer is arranged between an optical filter and an encapsulation layer of the sensor.

According to an embodiment, said first layer is integrated to an optical filter interposed between the sensor and the screen.

An embodiment provides a display screen, wherein the first layer is formed between an insulating support of the screen and a substrate from which the screen components are formed.

An embodiment provides a display screen, wherein said first layer is formed between a substrate from which the screen components are formed and a buffer layer separating the substrate from a semiconductor stack forming transistors.

An embodiment provides an image sensor, wherein said first layer is formed between a transparent layer defining electrodes of photodiodes of the sensor and an overlying encapsulation layer.

An embodiment provides a cell phone comprising at least one device such as described.

An embodiment provides a smart watch comprising at last one device such as described.

An embodiment provides a touch pad comprising at least one device such as described.

An embodiment provides a computer comprising at least one device such as described.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Figure 1:
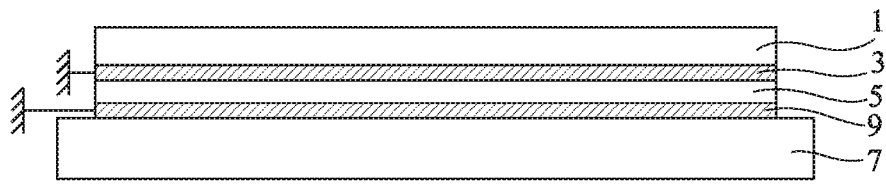
FIG. 1 is a simplified cross-section view of an embodiment of an electronic device integrating an image sensor behind a display screen.

The same elements have been designated with the same reference numerals in the different drawings.

For clarity, only those steps and elements which are useful to the understanding of the embodiments which will be described have been shown and will be detailed. In particular, the operation of the display screen and of the fingerprint sensor has not been detailed, the described embodiments being compatible with usual screens and sensors. Further, the other components of the electronic device integrating a display screen and an image sensor have not been detailed either, the described embodiments being compatible with the usual other components of electronic devices comprising a display screen.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to the terms "approximately", "about", and "in the order of", this means to within 10%, preferably to within 5%.

Further, in the following description, when reference is made to terms qualifying absolute positions, such as terms "high", "low", "left", "right", etc., or relative positions, such a terms "above", "under", "upper", "lower", etc., or to terms qualifying orientation, such as term "horizontal", "vertical", unless otherwise specified, reference is made to the orientation of the drawings.

A display screen, for example, a screen of organic light-emitting diode (OLED) type, is generally integrated in an electronic device such as a cell phone, a smart watch, a touch pad, a computer, by being placed on an electronic board supporting the electronic components of the device. A copper layer is then generally placed on the back side of the screen and is connected to ground to decrease electromagnetic disturbances between the screen and the electronic components.

The presence of the copper layer and its location raise an issue for the integration of an image sensor under the display screen. This issue is particularly critical for the integration of an image sensor for fingerprint sensor purposes. Indeed, the screen operation generates a high noise on the signal captured by the image sensor. It could have been devised to turn off the screen during periods when the image sensor is desired to be used. However, in an application to a fingerprint sensor, it is preferably to keep the screen on to illuminate the finger placed on the screen.

According to the described embodiments, it is provided to interpose, between the display screen and the fingerprint sensor, a specific shielding layer having the property of giving way to light all the way to the image sensor. Preferably, the layer used to decrease electromagnetic disturbances, supported by the electronic board, is maintained but is offset under the image sensor.

FIG. 1 is a simplified cross-section view of an embodiment of an electronic device integrating a fingerprint sensor behind a display screen.

According to this embodiment, shown in simplified fashion, the device successively comprises, from the outside (the upper surface):

a display screen 1, preferably of OLED type;
a conductive layer 3 permeable to light, intended to be electrically coupled, preferably connected, to a ground of the device;
an image sensor 5; and
an electronic board 7 supporting various components (not shown), which are a function of the destination of the electronic device.

Preferably, a conductive layer 9, preferably made of copper, is interposed between image sensor 5 and electronic board 7, and is connected to the ground of the device. The screen does not necessarily cover the entire surface of the electronic board, typically if the screen is smaller than the electronic board. The inverse is also possible (electronic board smaller than the screen).

For simplification, the rest of the elements of the electronic device (package, buttons, battery, camera, etc.) has not been shown since the described embodiments are compatible with these different elements.

The presence of layer 3 decreases the noise originating from screen 1 and particularly from the electronic circuits that it contains. Layer 3 ensures a function of electromagnetic shielding between the active portions of the screen 1 and the active portions of image sensor 5. Since layer 3 is permeable to light (layer 3 is preferably transparent), it does not disturb the operation of image sensor 5. Layer 3 is arranged between the active elements (capturing light) of the image sensor and the electronic components (generating switching noise) of the screen.

Conductive layer 3 is sufficiently thin, preferably with a thickness smaller than 100 μm, and more preferably than a few μm, to remain compatible with an integration with a fingerprint sensor integrable under a flat screen, preferably of OLED type, without excessively increasing the total thickness.

Layer 3 is preferably made of a material selected from among:

a metal, preferably gold, sufficiently thin (having a thickness smaller than 10 nm, preferably smaller than 5 nm) to be transparent while keeping, at this low thickness, sufficient conduction properties for a shielding function; a metal oxide, for example, an indium tin oxide (ITO);
a conductive polymer, having a thickness smaller than 10 μm, preferably, of PEDOT:PSS (mixture of poly(3,4-ethylenedioxythiophene) and of sodium polystyrene sulfonate, which has the advantage of being already used in the manufacturing of the image sensors targeted by the present disclosure; a network of silver nanowires; or a combination of such materials (for example, silver nanowires embedded in PEDOT:PSS).

Several embodiments respecting the feature of having a transparent conductive layer 3 between the active level of image sensor 5 and the electronic level of screen 1 are described hereafter. As described hereafter, transparent conductive layer 3 may however be integrated at different levels of display screen 1 or of image sensor 5, particularly in embodiments where it is provided to form the two of them (screen and sensor) separately and then to place screen 1 onto image sensor 5, itself placed on electronic board 7.

Figure 2:
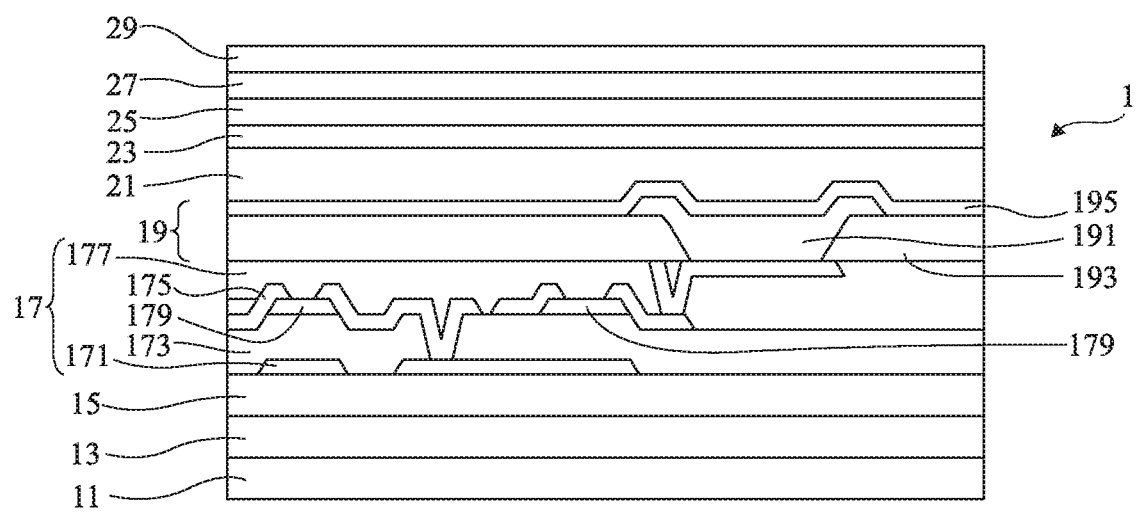
FIG. 2 schematically and partially shows in cross-section view an embodiment of an OLED-type display screen.

FIG. 2 schematically and partially shows in cross-section view an embodiment of an OLED-type display screen 1. FIG. 2 shows a single display pixel.

Such a screen 1 generally successively comprises:

a back or rear surface 11, formed of an insulating film or insulating support, for example, made of transparent polyethylene terephthalate (PET);

a substrate 13 (generally flexible for OLED screens) made of an insulating material, for example, of polyimide);

optionally, a buffer layer 15 (insulating) between the active levels of the transistors and underlying layers 11 and 13;

a semiconductor stack 17 forming the individual control transistors of each screen pixel, the stack being as an example symbolized in FIG. 2 by gate conductors 171, a gate dielectric layer 173, drain and source regions 175 separated by active regions 179 (for example, made of polysilicon or of indium gallium zinc oxide (IGZO)), and a passivation layer 177;

an emission stack 19 performing the actual emission, symbolized in FIG. 2 by pixelated emission areas 191 in a passivation layer 193 topped with a cathode 195, the drain or source layer 175 of stack 17 defining the anode of each pixel;

a transparent insulating encapsulation layer 21;

an optional touch layer 23 (present in touch screens);

a polarizing filter 25; and a glass or plastic plate 29 glued (adhesive layer 27) onto the filter.

Certain layers linked to the manufacturing of the structure, such as an adhesive layer between layers 11 and 13, a multilayer barrier at the level of substrate 13 having the role of protecting the organic layers from humidity and from oxygen, have not been shown, the shown structure symbolizing the main layers of the screen. Further, the forming of stack 17 is an example only, and the transistors may be organic or inorganic (for example, transistors made up of amorphous silicon, of metal oxide, for example, of indium gallium zinc oxide (IGZO), of polysilicon, for example, low temperature polysilicon (LIPS), etc.).

The forming of FIG. 2 is an example and other usual screen structure, OLED or not, may be used to implement the described embodiments.

Figure 3:
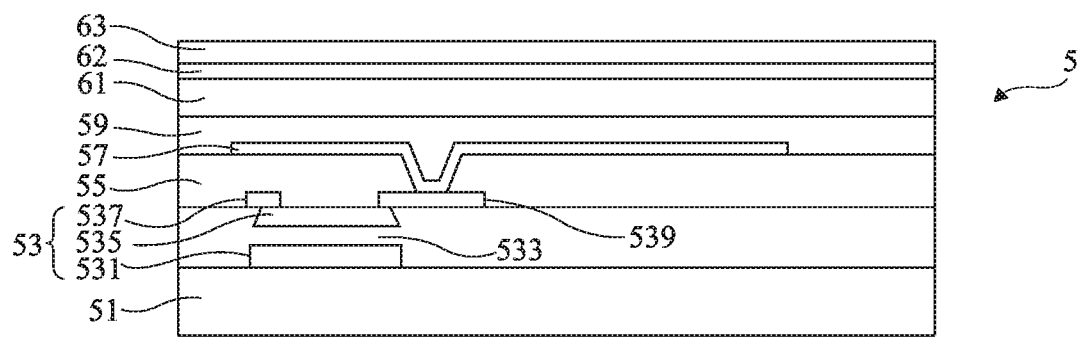
FIG. 3 schematically and partially shows in cross-section view an embodiment of an image sensor.

FIG. 3 schematically and partially shows in cross-section view an embodiment of an image sensor 5. The case of a sensor made up of organic materials such as described in the above-mentioned publications is considered. FIG. 3 shows a single pixel of the image sensor.

Such a sensor 5 generally successively comprises:

a substrate 51, for example, made of glass in the case of a rigid sensor, or of polyimide, or polyethylene terephthalate (PET), of polyethylene naphthalate (PEN) or cycloolefin polymer (COP) or another polymer in the case of a flexible sensor, particularly when sensor 5 originates from a printing manufacturing technology;

an active stack 53 of sensors formed of transistors (gate 531, gate dielectric 533, active region 535, source 537, drain 539), the active region being for example made up of amorphous silicon, of metal oxide, for example, of indium gallium zinc oxide (IGZO), of polysilicon, for example, low-temperature polysilicon (LIPS), or the transistors being organic thin film transistors (OTFT); a dielectric layer 55 insulating stack 53 from a layer of first back side electrodes 57 of photodiodes, generally coupled to drains 539 of the transistors; a layer 59 of semiconductor organic material forming the photodiodes;

a transparent layer of second electrodes 61 of the photodiodes;

an encapsulation layer 62; and a layer 63 preferably forming an optical filter of angular selection of the image sensor excitation signals.

In practice, adhesive layers are present between layers 61 and 62 and between layers 62 and 63.

The forming of FIG. 3 is an example and other image sensor structures may be used for the implementation of the described embodiments. In particular, optical filter 63 may be formed separately from image sensor 5.

FIGS. 2 and 3 schematically illustrate screen and sensor structures having an operation which is usual per se and which is not detailed.

Transparent conductive layer 3, coupled to ground, may be provided at different levels of the stacked structure of a screen and of an image sensor.

FIGS. 4, 5, 6, 7, and 8 illustrate different embodiments of layer 3 according to its layout in the stack. These drawings show, as specific embodiments, the structures illustrated in FIGS. 2 and 3 concerning the screen and the image sensor. The shown layers of these structures are, for simplification, symbolized by a single layer to which the references of the different layers of FIG. 2 or of FIG. 3 that it contains have been assigned. In all these embodiments, the presence of an additional metal shielding layer 9, preferably made of copper, between the image sensor (under its substrate 51) and electronic board 7 is assumed.

Figure 4:
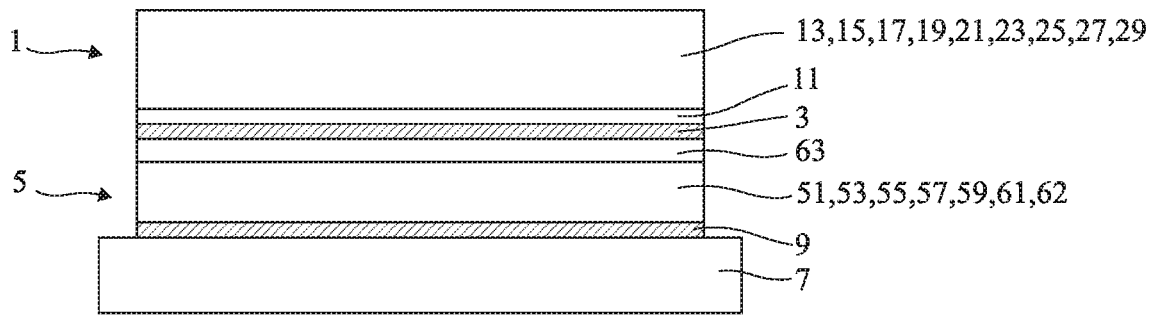
FIG. 4 illustrates an embodiment of an electronic device integrating a screen and an image sensor.

FIG. 4 illustrates an embodiment of an electronic device integrating a screen 1 and an image sensor 5.

According to an embodiment, transparent conductive layer 3, coupled to ground, is present between the transparent PET layer 11 of screen 1 and optical filter 63. The forming of layer 3 may then form part of the manufacturing process of screen 1, of that of sensor 5 if filter 63 is formed with the sensor, or of filter 63.

Figure 5:
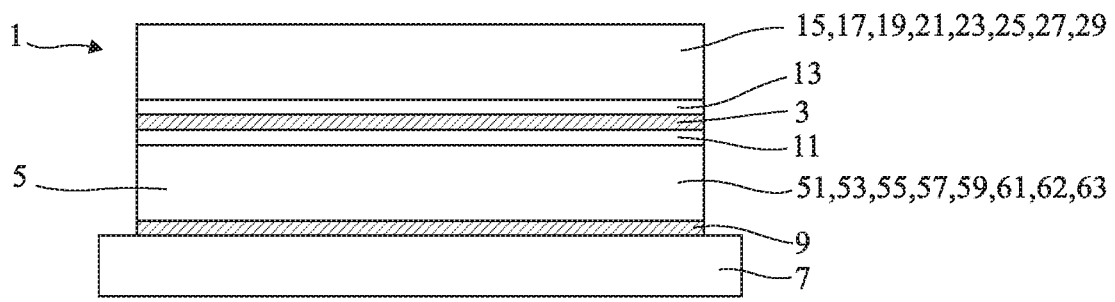
FIG. 5 illustrates another embodiment of an electronic device integrating a screen and an image sensor.

FIG. 5 illustrates another embodiment of an electronic device integrating a screen 1 and an image sensor 5.

According to this embodiment, transparent conductive layer 3, coupled to ground, is formed between the insulating support 11 of screen 1 and the flexible substrate 13 from which the screen components are formed, substrate 13 being transparent.

Figure 6:
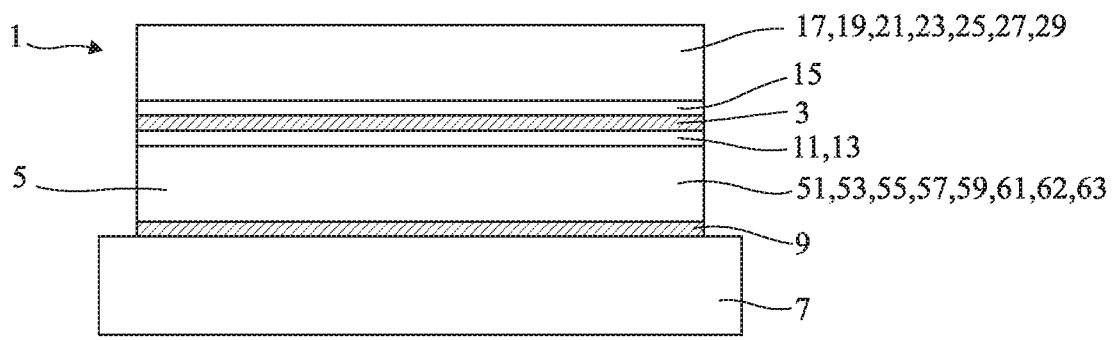
FIG. 6 illustrates another embodiment of an electronic device integrating a screen and an image sensor.

FIG. 6 illustrates another embodiment of an electronic device integrating a screen and an image sensor.

According to this embodiment, transparent conductive layer 3, coupled to ground, is formed between substrate 13 and buffer layer 15.

Figure 7:
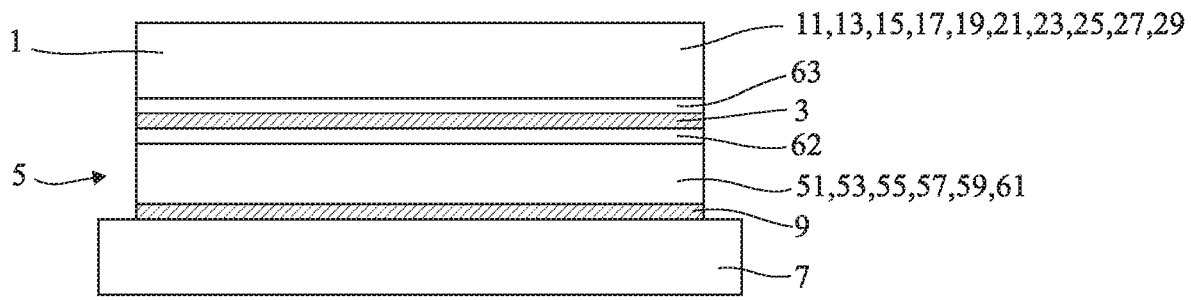
FIG. 7 illustrates another embodiment of an electronic device integrating a screen and an image sensor.

FIG. 7 illustrates another embodiment of an electronic device integrating a screen 1 and an image sensor 5.

According to this embodiment, transparent conductive layer 3, coupled to ground, is arranged between the encapsulation layer 62 of sensor 5 and optical filter 63.

A particularly simple embodiment then is to coat encapsulation layer 62 of the sensor with a PEDOT:PSS layer 3, the sensor manufacturing method already implementing, in the technologies more particularly targeted by the present disclosure, a PEDOT:PSS deposition step.

As a variation, the forming of layer 3 forms part of the method of manufacturing filter 63 if the latter is formed independently from sensor 5.

Figure 8:
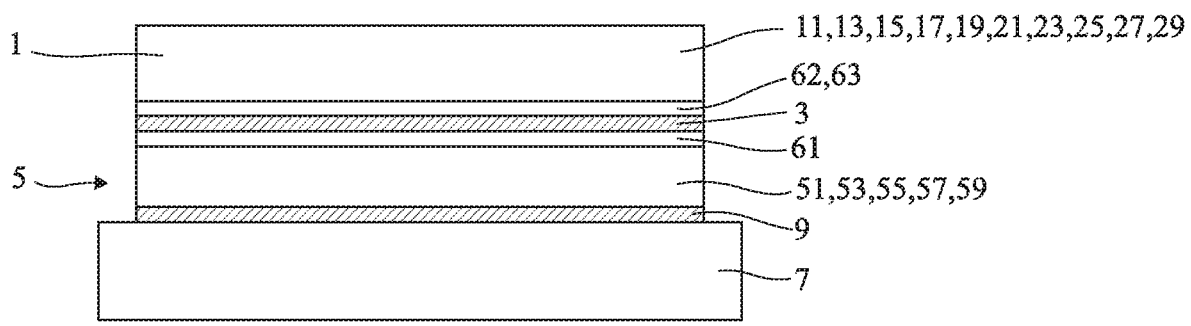
FIG. 8 illustrates another embodiment of an electronic device integrating a display and an image sensor.

FIG. 8 illustrates another embodiment of an electronic device integrating a screen 1 and an image sensor 5.

According to this embodiment, transparent conductive layer 3, coupled to ground, is formed between the layer of photodiode electrodes 61 and the encapsulation layer 62 of sensor 5.

Whatever the above embodiment, the setting to ground of shielding layer 3 may be performed by a connection to ground at the level of display screen 1, at the level of image sensor 5, and/or at the level of electronic board 7.

Figure 9:
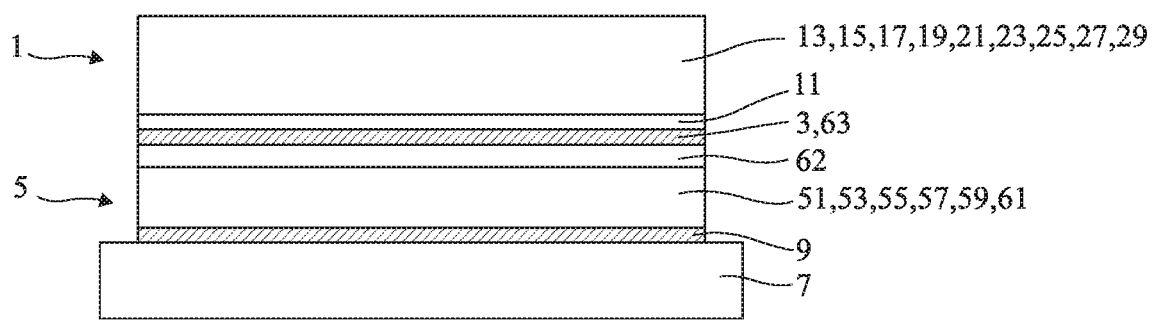
FIG. 9 illustrates another embodiment of an electronic device integrating a screen and an image sensor.

FIG. 9 illustrates still another embodiment of an electronic device integrating a screen 1, an optical filter 63, and an image sensor 5.

According to this embodiment, transparent conductive layer 3, coupled to ground, faults part of optical filter 63 by being embedded in the structure thereof. For example, in the case of an optical filter 63 including a conductive mesh, the mesh is connected to ground to form shielding 3.

It should be noted that layer 3 may occupy a surface area smaller than the surface area of screen 1, provided for its surface to cover sensor 5 at least opposite screen 1. Layer 3 may thus have a surface area different than the surface area of sensor 5 and/or than the surface area of screen 1, provided to cover the area therebetween.

According to a preferred embodiment where layer 3 is made of transparent polymer, preferably, PEDOT:PSS, advantage is taken from the characteristics of this layer to allow a full plate deposition without being concerned about the pixel patterns. This considerably simplifies the forming of the shielding since it is not necessary to provide a specific etch mask. Such an embodiment is particularly advantageous in the context of the forming of a fingerprint sensor where the meshed shielding structures risk deteriorating the signal-to-noise ratio of the sensor.

An advantage of the described embodiments is that they are compatible with usual techniques of manufacturing of screen 1 and of image sensor 5. In particular, the insertion of shielding layer 3, be it in the screen manufacturing method (FIG. 5 or 6), in the image sensor manufacturing method (FIG. 7 or 8), or between the screen and the image sensor (FIG. 4), does not modify the active regions of the screen and of the image sensor.

Another advantage of the described embodiments is that they remain compatible with the use of a copper shielding between the sensor/screen assembly and the electronic board.

As a specific embodiment, a device, integrating an image sensor 5 and a display screen 1 with an interposed transparent conductive ITO shielding layer 3, has been formed in accordance with the embodiment of FIG. 4 (layer 3 between optical filter 63 and substrate 1). Layer 3 has been coupled to the ground of the electronic screen driving circuits (ground of the circuits of layer 17) and to the ground of the electronic sensor readout circuits (connected to the ground of electronic board 7). Measurements have been performed by displaying a white image on the screen, and measurements of the noise and of the signal-to-noise ratio have been performed at the level of the sensor for a black object and a reflecting object placed on the screen, with and without a shielding layer. The measurements have shown a decrease in the order of 17% of the noise and an improvement by more than one dB of the signal-to-noise ratio. Such results are significant for image sensors, particularly fingerprint sensors, for which the slightest improvement in terms of decrease of the noise or of improvement of the signal-to-noise ratio is a significant progress.

Various embodiments have been described. Various modifications will occur to those skilled in the art. In particular, the selection of the embodiment, particularly of the integration of layer 3 on the side of screen 1 or on the side of sensor 5, depends on the application and on the possible other steps involved in the device manufacturing. Layer 3 may be arranged at various locations, provided to be located between the active portions of display screen 1 and the active portions of image sensor 5. Further, the practical implementation of the described embodiments is within the abilities of those skilled in the art by using the functional indications given hereabove and by using current OLED screen and organic image sensor manufacturing techniques.

The invention claimed is:

1. A device comprising: a display screen and an image sensor, wherein a first electromagnetic shielding layer permeable to light is arranged between active portions of the display screen and active portions of the image sensor, wherein the image sensor comprises a fingerprint sensor made of an organic material, and wherein said first electromagnetic shielding layer is made of a transparent conductive polymer.

2. The device according to claim 1, wherein the first electromagnetic shielding layer is intended to be coupled to a ground of the device.

3. The device according to claim 1, further comprising a second electromagnetic shielding layer, intended to be coupled to a ground of the device, is arranged between the image sensor and an electronic board.

4. The device according to claim 1, wherein said first electromagnetic shielding layer has a thickness smaller than 10 μm.

5. The device according to claim 4, wherein the said electromagnetic shielding layer made of the transparent conductive polymer, is full plate.

6. The device according to claim 1, wherein said first electromagnetic shielding layer integrates a network of silver nanowires.

7. The device according to claim 1, wherein a surface area of said first electromagnetic shielding layer corresponds at least to an opposite surface area between the display screen and the image sensor.

8. The device according to claim 1, wherein said first electromagnetic shielding layer is arranged between an optical filter and a support of the display screen.

9. The device according to claim 1, wherein said first electromagnetic shielding layer is arranged between an optical filter and an encapsulation layer of the image sensor.

10. The device according to claim 1, wherein said first electromagnetic shielding layer is integrated to an optical filter interposed between the image sensor and the display screen.

11. The device according to claim 1, wherein said first electromagnetic shielding layer is formed between an insulating support of the display screen and a substrate from which screen components are formed.

12. The device according to claim 1, wherein said first electromagnetic shielding layer is formed between a substrate from which screen components are formed and a buffer layer separating the substrate from a semiconductor stack forming transistors.

13. The device according to claim 1, wherein said first electromagnetic shielding layer is formed between a transparent layer defining electrodes of photodiodes of the image sensor and an overlying encapsulation layer.

14. A cell phone comprising one or more of the devices according to claim claim 1.

15. A smart watch comprising one or more of the devices according to claim 1.

16. A touch pad comprising one or more of the devices according to claim claim 1.

17. A computer comprising one or more of the devices according to claim claim 1.

18. The device according to claim 1, wherein the transparent conductive polymer is a mixture of poly(3,4-ethylenedioxythiophene) and sodium polystyrene sulfonate.

19. A device comprising:

a display screen having active portions;

a fingerprint image sensor having active portions; and a transparent conductive polymer layer arranged between the active portions of the display screen and the active portions of the fingerprint image sensor, wherein the transparent conductive polymer layer provides electromagnetic shielding between the active portions of the display screen and the active portions of the fingerprint image sensor while being permeable to light to allow the fingerprint image sensor to capture light.

\* \* \* \* \*